United States Patent Office 3,223,700
Patented Dec. 14, 1965

3,223,700
GLYCINE AMIDES
Wilfrid Klavehn, Schwetzingen, Baden, and Horst Neumann, Ludwigshafen (Rhine), Germany, assignors to Knoll A.-G. Chemische Fabriken, Ludwigshafen (Rhine), Germany, a corporation of Germany
No Drawing. Filed June 9, 1961, Ser. No. 115,886
Claims priority, application Germany, June 11, 1960, K 40,929; Aug. 23, 1960, K 41,523
14 Claims. (Cl. 260—239.1)

The present invention relates to new and valuable derivatives of amino acetic acid amide, i.e. glycine amide, and more particularly to glycine amide compounds with a secondary amino group and to their acid addition salts, and to a process of making such compounds.

A large number of substituted glycine amides are described in the literature. Almost all of them, however, are amino acetamides with a tertiary amino group.

It is one object of the present invention to provide new and valuable glycine amides which have a secondary amino group and which have proved to be of considerable antibacterial activity.

Another object of the present invention is to provide pharmaceutically acceptable and therapeutically useful acid addition salts of such new glycine amides and especially their penicillin addition salts.

A further object of the present invention is to provide simple and effective processes of producing such new and valuable glycine amides and their acid addition salts.

Still another object of the present invention is to provide new and valuable disinfectant and chemo-therapeutic compositions of noteworthy antimicrobial activity.

Other objects of the present invention and advantageous features thereof will become apparent as the description proceeds.

In principle, the glycine amides according to the present invention are characterized by the following Formula I:

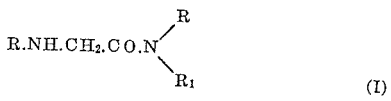
(I)

In said formula

R indicates the same or different, saturated or unsaturated, straight chain or branched alkyl radicals with 5 to 14 carbon atoms or saturated or unsaturated alkyl-substituted, preferably lower alkyl-substituted cycloalkyl or, respectively, bicycloalkyl radicals with 6 to 8 carbon atoms which are attached to the nitrogen atom either directly or by means of a methylene or, respectively ethylene radical; and $R_1$ represents hydrogen or a saturated or unsaturated straight chain or branched alkyl radical with 3 to 12 carbon atoms.

The new glycine amides according to the present invention exhibit in the form of the free bases as well as in the form of their acid addition salts a surprisingly high antimicrobial activity mainly against Gram-positive germs as, for instance, against *Staphylococcus aureus* or against various Streptococcus species. Some of these new compounds are also effective against Gram-negative microorganisms, such as *Escherichia coli*. They may be used not only as disinfectants but also as chemotherapeutic agents, especially for combating local infections.

The glycine amides of Formula I may be prepared by the following methods:

(a) They may be obtained by reacting halogeno acetic acid amides of Formula II

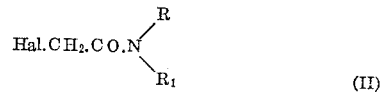
(II)

wherein

Hal represents chlorine, bromine, or iodine, with an amine of Formula III

$R.NH_2$ (III)

Thereby either an excess of the amine is used as hydrogen halide binding agent or equimolecular quantities of the two reactants are reacted in the presence of an inert solvent and of an acid binding agent, such as sodium carbonate or potassium carbonate.

(b) Another method of the preparation of the compounds of Formula I starts with derivatives of halogeno acetic acid of Formula IV:

$Hal.CH_2.CO.Y$ (IV)

wherein

Y represents a lower alkoxy group or halogen which are reacted with at least two moles of an amine of Formula III $R.NH_2$ (III)

or first with one mole of an amine of Formula V

(V)

and then with one mole of an amine of Formula III $R.NH_2$ (III)

(c) The glycine amides according to the present invention may also be obtained by condensing derivatives of amino acetic acid of Formula VI $R.NH.CH_2.CO.Y$ (VI)

with an amine of Formula V

(V)

(d) Another process of preparing said glycine amides comprises reacting halogeno acetic amides of Formula II

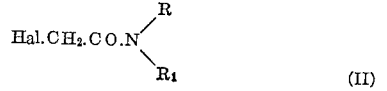
(II)

with one mole of an amine of Formula III $R.NH_2$ (III)

and then with an amine of Formula V

(V)

or reacting an amino acetic acid of Formula I

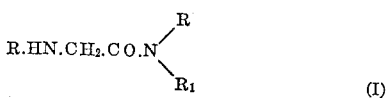
(I)

with an amine of Formula V

(V)

of a composition different from that of the

residue present in the starting material.

In both cases transamidation takes place at increased temperatures, whereby glycine amides are obtained in which the two substituents R indicate either of the same radicals or in which the substituent R attached to the amino nitrogen atom has another significance than the substituent R attached to the amide nitrogen atom.

(e) Another method of preparing the glycine amides according to the present invention consists in converting derivatives of amino acetic acid of Formula VII $$NH_2CH_2.CO.Z \qquad (VII)$$

wherein

Z indicates a lower alkoxy group or the group

into the corresponding compounds with the secondary amino group by reaction with hydrocarbon halides of Formula VIII $$Hal.R \qquad (VIII)$$

When using the esters as starting materials, the resulting secondary amino compounds are subsequently converted into the corresponding acid amides by reaction with an amine of the Formula V

(f) The glycine amides according to the present invention may also be obtained by reductive condensation of derivatives of amino acetic acids of Formula VII $$H_2N.CH_2.CO.Z \qquad (VII)$$

with corresponding aldehydes or ketones in the presence of nascent or catalytically activated hydrogen whereby compounds with a secondary amino group are produced. If esters are used as starting materials, the resulting secondary amino compounds are subsequently converted into the corresponding acid amides by reaction with an amine of Formula V

(g) Preparation of unsymmetrically substituted glycine amides is also possible by first converting derivatives of halogeno acetic acids of Formula IV $$Hal.CH_2.CO.Y \qquad (IV)$$

into the corresponding halogeno acetic acid amides by reaction with an amine of Formula V

and then reacting the resulting halogeno acetic acid amides with an amine of Formula III $$R.NH_2 \qquad (III)$$

wherein

R indicates a substituent differing from that of the amido group.

The resulting glycine amides which contain unsaturated alkyl, cycloalkyl, or bicycloalkyl radicals can subsequently be hydrogenated to the corresponding saturated compounds. Hydrogenation may be effected, for instance, by the action of nascent hydrogen or of catalytically activated hydrogen.

Most of the new glycine amides according to the present invention are liquid bases which can be distilled without decomposition. They are only slightly soluble in water but readily soluble in the usual organic solvents. Their acid addition salts, particularly their salts with organic acids, possess surface-active properties and foam in aqueous solutions. A number of inorganic salts of these bases are also somewhat soluble in non-polar organic solvents.

The new compounds are preferably used in therapy and administered in the form of their acid addition salts. By selecting specific acids for salt formation it is possible to adapt the acid addition salts of the glycine amides according to the present invention to specific conditions of administration in therapy. For instance, it is possible to produce highly water soluble salts or salts which are soluble in oils or fats, and the like. Inorganic acids as well as organic acids may be used for the preparation of such salts. Suitable salt-forming inorganic acids are, for instance, hydrochloric acid, hydrobromic acid, hydriodic acid, sulfuric acid, phosphoric acid, sulfamic acid, and others while oxalic acid, succinic acid, tartaric acid, citric acid, maleic acid, malonic acid, gluconic acid, mucic acid, undecenylic acid, oleic acid, stearic acid, phthalic acid, salicylic acid, penicillin in its acid form, and others may be used as organic acids for said purpose.

The following examples serve to illustrate the present invention without, however, limiting the same thereto.

EXAMPLE 1

(2-methyl-2-heptenyl-6)-amino-N-(2-methyl-2-heptenyl-6)-acetamide 60 g. of chloro acetyl-(2-methyl-2-heptenyl-6)-amide (0.3 mole) are added to 96 g. of 6-amino-2-methyl-2-heptene (0.75 mole). Reaction sets in with considerable generation of heat, whereby the temperature rises to above 100° C. The reaction is completed by heating at 180° C. to 190° C. for two hours. After cooling, the dark reaction mixture is diluted with 200 cc. of 2 N sodium hydroxide solution and extracted twice with 150 cc. of ether. The ethereal solution is dried over potassium carbonate. The ether is distilled off by heating on a water bath, and the residue is distilled in a vacuum.

After recovery of the unreacted excess of the primary amine reactant of the boiling point 70–73° C./7 mm. Hg the (2 - methyl - 2 - heptenyl - 6) - amino-N-(2-methyl-2-heptenyl-6)-acetamide, $C_8H_{15} \cdot NH \cdot CH_2 \cdot CO \cdot NH \cdot C_8H_{15}$ is obtained.

Boiling point: 194–195° C./3 mm. Hg
Yield: 80–85% of the theoretical yield.
Melting point:
  Of its acid oxalate: 189° C. (with decomposition),
  Of its mucinate: 108° C.

EXAMPLE 2

(2,6-dimethyl-2-octenyl-8)-amino-N-cyclohexyl acetamide 52.5 g. of chloro acetyl cyclohexyl amide (0.3 mole) are added to 116 g. of 8-amino-2,6-dimethyl-2-octene (0.75 mole). The reaction mixture is heated to a temperature of 110° C. for 12 hours. The resulting reaction mixture is worked up by following the procedure described in Example 1. (2,6-dimethyl-2-octenyl-8)-amino-N-cyclohexyl acetamide, $$C_{10}H_{19} \cdot NH \cdot CH_2 \cdot CO \cdot NH \cdot C_6H_{11}$$

is obtained thereby.

Boiling point: 182–183° C./0.01 mm. Hg,
Yield: 60–70% of the theoretical yield.
Melting point:
  Of the hydrochloride: 158° C.,
  Of the sulfamate: 138° C.,
  Of the acid tartrate: 155° C.

To convert this compound into the corresponding saturated base, 33 g. of the hydrochloride (0.1 mole) are dissolved in 250 cc. of methanol and are catalytically hydrogenated in the presence of 0.5 g. of platinum oxide. As soon as absorption of hydrogen ceases, the catalyst is filtered off by suction, the solvent is almost completely removed by evaporation, and the hydrochloride of the new compound is precipitated by the addition of ether. The hydrochloride of the (2,6-dimethyloctyl-8)-amino-N-cyclohexyl acetamide,

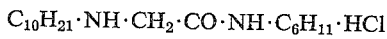
$C_{10}H_{21} \cdot NH \cdot CH_2 \cdot CO \cdot NH \cdot C_6H_{11} \cdot HCl$ melts at 163.5° C.

Yield: 90% of the theoretical yield.

EXAMPLE 3

*(2,6-dimethyl-2-octenyl-8)-amino N-norbornyl acetamide*

77.5 g. of 8-amino-2,6-dimethyl-2-octene (0.5 mole) and 93.3 g. of chloro acetyl nor-bornylamide (0.5 mole) are dissolved in 1500 cc. of toluene. The solution is heated to boiling under reflux in the presence of 159 g. of anhydrous sodium carbonate for 8 hours. After cooling, the reaction mixture is filtered and the solvent is distilled off in a vacuum. The residue is dissolved in 500 cc. of ether. The ethereal solution is treated twice with water, each time with 150 cc., dried over potassium carbonate, the ether evaporated on the water bath, and the residue distilled in a vacuum. (2,6-dimethyl-2-octenyl-8)-amino-N-norbornyl acetamide, $C_{10}H_{19} \cdot NH \cdot CH_2 \cdot CO \cdot NH \cdot C_7H_{11}$ is obtained thereby.

Boiling point: 179–181° C.
Yield: 50–60% of the theoretical yield.
Melting point:
  Of the hydrochloride: 193° C.
  Of the sulfamate: 168° C.

*(2,6-dimethyloctyl-8)-amino-N-norbornyl acetamide*

The hydrochloride of the corresponding saturated base (2,6-dimethyl octyl-8)-amino-N-norbornyl acetamide,
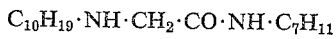
$C_{10}H_{21} \cdot NH \cdot CH_2 \cdot CO \cdot NH \cdot C_7H_{11} \cdot HCl$, melting point 192° C., is obtained by catalytic hydrogenation of said unsaturated compound as described in Example 2.

EXAMPLE 4

*(2-methyl-2-heptenyl-6)-amino-N-(2methyl-2-heptenyl-6)-acetamide*

50.1 g. of bromo acetic acid ethyl ester (0.3 mole) are added drop by drop to 152 g. of 6-amino-2-methyl-2-heptene (1.2 mole; melting point 170–172° C.) in a flask equipped with a descending condenser. The temperature rises to 80° C. To eliminate the formed ethanol, the temperature is increased to 125° C., whereby the alcohol distills off. To complete the reaction, the mixture is heated under reflux for 2 hours. After cooling, the reaction mixture is dissolved in 500 cc. of ether and the ethereal solution is extracted with 200 cc. of 2 N sodium hydroxide solution. The aqueous layer is separated and the ether is distilled off from the ethereal extract by heating on the water bath. The residue is subjected to vacuum distillation.

The unreacted excess of the primary base reactant is first recovered. Thereafter (2-methyl-2-heptenyl-6)-amino-N-(2-methyl-2-heptenyl-6)-acetamide,

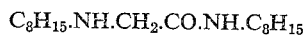
$C_8H_{15} \cdot NH \cdot CH_2 \cdot CO \cdot NH \cdot C_8H_{15}$ distills in the form of a mobile oil.

Boiling point: 194–195° C./3 mm. Hg;
Yield: 75–85% of the theoretical yield;
Melting point of the acid oxalate: 185° C. (with decomposition).

EXAMPLE 5

*(2-methyl-2-heptenyl-6)-amino-N-(2-methyl-2-heptenyl-6)-N-(isopropyl)-acetamide*

51 g. of 6-isopropylamino-2-methyl-2-heptene (0.3 mole) are dissolved in 500 cc. of toluene and 100 g. of anhydrous sodium carbonate are admixed thereto. 33.9 g. of chloro acetyl chloride (0.3 mole) are then added to the mixture at a temperature of 10° C. Thereafter, again 500 cc. of toluene, 100 g. of anhydrous sodium carbonate, and 39 g. of 6-amino-2-methyl-2-heptene (0.3 mole) are added and the reaction mixture is heated under reflux for 8 hours. The reaction mixture is worked up by following the procedure described in Example 3. (2-methyl-2-heptenyl-6)-amino - N - (2-methyl-2-heptenyl-6)-N-(isopropyl) acetamide, $C_8H_{15} \cdot NH \cdot CH_2 \cdot CO \cdot N(C_8H_{15})(C_3H_7)$, is is obtained.

Boiling point: 183° C./2 mm. Hg;
Melting point of the acid opalate: 117° C.

EXAMPLE 6

*(2,6-dimethyl-2-octenyl-8)-amino-N-(norbornyl methyl) acetamide*

24 g. of (2,6-dimethyl-2-octenyl-8)-amino acetic acid ethyl ester (0.1 mole) and 27.5 g. of norbornyl methylamine (0.22 mole) are heated under reflux in 250 cc. of butanol in the presence of 10.6 g. of sodium butylate (0.11 mole) for 3 hours. The solvent is distilled off in a vacuum. The residue is mixed with 250 cc. of water. The reaction mixture is extracted three times with ether, each time with 100 cc. The ethereal solution is dried over potassium carbonate. The ether is distilled off and the residue is subjected to vacuum distillation. After recovery of the excess primary amine reactant (2,6-dimethyl-2-octenyl-8)-amino-N-(norbornyl-methyl) acetamide,

$C_{10}H_{19}NH \cdot CH_2 \cdot CO \cdot NH \cdot CH_2 \cdot C_7H_{11}$ is obtained.

Boiling point: 208–210° C./0.1 mm. Hg;
Yield: 70–80% of the theoretical yield.
Melting point:
  Of the hydrochloride: 161° C.,
  Of the sulfamate: 159° C.,
  Of the acid oxalate: 204° C. (with decomposition).

The same compound is obtained in a somewhat better yield by heating the (2,6-dimethyl-2-octenyl-8)-amino acetic acid ethyl ester with excess norbornyl methylamine in the absence of solvents and/or condensing agents for a prolonged period of time.

EXAMPLE 7

*(Undecyl-2)-amino-N-(undecyl-2)-acetamide*

60 g. of chloro acetyl-(5-dehydro-norbornylmethyl) amide (0.3 mole) are added to 128 g. of 2-amino undecane (0.75 mole). The temperature rises to 90–95° C. Thereafter, the reaction mixture is heated to 210–220° C. for 5 hours and is then worked up by following the procedure described in Example 1. Fractional distillation in a vacuum yields first the unsaturated base 5-dehydro-norbornyl methylamine which is split off in the course of the reaction. Boiling point: 52–54° C./4 mm. Hg. Thereafter, the (undecyl-2)-amino-N-(undecyl-2)acetamide

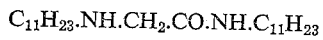
$C_{11}H_{23} \cdot NH \cdot CH_2 \cdot CO \cdot NH \cdot C_{11}H_{23}$ is obtained in the form of a viscous, light yellow oil.

Boiling point: 210–215° C./0.1 mm. Hg;
Yield: 75% of the theoretical yield;
Melting point
  Of the sulfamate: 100° C.,
  Of the acid oxalate: 188° C. (with decomposition),
  Of the mucinate: 107° C.

EXAMPLE 8

*Heptylamino-N-(norbornyl-methyl) acetamide*

51.5 g. of amino acetic acid ethyl ester (0.5 mole) and 89 g. of 1-bromo heptane (0.5 mole) are heated under reflux in 1500 cc. of butanol in the presence of 150 g. of anhydrous sodium carbonate for 8 hours. The reaction mixture is further worked up by following the procedure as described in Example 3. Thereby the heptylamino acetic acid ethyl ester, $C_7H_{15}.NH.CH_2.COO.C_2H_5$ is obtained. Boiling point: 95–96° C./0.05 mm. Hg. Yield: 50–60% of the theoretical yield.

20.1 g. of heptylamino acetic acid ethyl ester (0.1 mole) and 27.5 g. of norbornyl methylamine (0.22 mole) are heated under reflux in 250 cc. of butanol in the presence of 10.6 g. of sodium butylate for 3 hours. The reaction mixture is worked up according to Example 6. Heptylamino-N-(norbornyl-methyl) acetamide, $$C_7H_{15}.NH.CH_2CO.NH.CH_2.C_7H_{11}$$

is obtained thereby.
Boiling point: 177–179° C./0.05 mm. Hg;
Yield: 60–70% of the theoretical yield;
Melting point:
  Of the hydrochloride: 78° C.,
  Of the sulfamate: 128° C.,
  Of the acid oxalate: 191° C. (with decomposition).

The same compound is obtained by reacting 64 g. of amino-N-(norbornyl-methyl) acetamide, boiling point: 195–200° C./13 mm. Hg, melting point: 34.5° C. (0.35 mole) with 63 g. of 1-bromo heptane (0.35 mole) in 1000 cc. of boiling butanol in the presence of 106 g. of anhydrous sodium carbonate as described in Example 3.

Yield: 50–60% of the theoretical yield.

EXAMPLE 9

*(2,6-dimethyl-2-octenyl-8)-amino-N-(5-dehydro-norbornyl-methyl) acetamide*

72 g. of amino-N-(5-dehydronorbornyl-methyl) acetamide (0.04 mole), boiling point: 186–188° C./4 mm. Hg; melting point: 27° C., are dissolved in 200 cc. of methanol. 69 g. of 2,6-dimethyl-2-octen-8-al (citronellal) (0.45 mole) in 200 cc. of methanol are added to said solution in the presence of 25 g. of activated aluminum while stirring. The temperature rises slowly to 50–60° C. While adding 50 cc. of water, the reaction mixture is heated to boiling reflux for 3 hours. After cooling, aluminum hydroxide and unreacted aluminum are separated by filtration. The solvent is distilled off in a vacuum by heating on a water bath and the residue is dissolved in ether. The ethereal solution is extracted twice with water, each time with 150 cc., in order to remove the primary glycine amide. The aqueous layer is separated and the ethereal solution is dried over magnesium sulfate. Previous treatment of the ethereal solution with a dilute mineral acid, such as hydrochloric acid, for separating the base from neutral components is not necessary, because the hydrochloride of the base is soluble in ether. The ethereal solution is evaporated to dryness on the water bath and the residue is distilled in a vacuum. (2,6-dimethyl-2-octenyl-8)-amino-N-(5-dehydronorbornyl-methyl) acetamide, $$C_{10}H_{19}.NH.CH_2.CO.NH.CH_2.C_7H_9$$

is obtained thereby,
Boiling point: 185–188° C./0.05 mm. Hg;
Yield 75% of the theoretical yield.

EXAMPLE 10

*(2,6-dimethyl-2-octenyl-8)-amino-N-(norbornyl-methyl) acetamide*

31 g. of amino acetic acid ethyl ester (0.3 mole) are dissolved in 200 cc. of methanol. 46.2 g. of 2,6-dimethyl-2-octen-8-al (citronellal) in 100 cc. of methanol are added thereto in the presence of 20 g. of activated aluminum while stirring. Thereafter, 20 cc. of water are added. The temperature rises to 55° C. The reaction mixture is heated to boiling under reflux for 3 hours. The reaction mixture is worked up by following the procedure described in Example 9. 2,6-dimethyl-2-octenyl-8-amino acetic acid ethyl ester is obtained thereby. Boiling point: 103–107° C./0.1 mm. Hg. Yield: 65–75% of the theoretical yield.

Reaction of said amino acid ester with norbornyl methylamine is effected as described in Example 6 and yield (2,6-dimethyl-2-octenyl-8)-amino-N-(norbornyl acetamide.

The following glycine amides have been prepared according to the present invention in the same manner as described hereinabove by using corresponding reaction components and proceeding as indicated:

TABLE I

| Example | Compound | Boiling point (° C./mm. Hg) | Melting point (° C.) | Yield (percent of theory) | Preparation according to example |
|---|---|---|---|---|---|
| 11 | (2,6-dimethyl-2-octenyl-8)-amino-N-(2,6-dimethyl-2-octenyl-8)-acetamide. | 205–207/0.2 | Mucinate, 132; acid oxalite, 190 (decomp.). | 80–90 or 60–70 | 1 or 4 |
| 12 | (2,6-dimethyl-2-octenyl-8)-amino-N-(cyclohexyl methyl) acetamide. | 212–213/0.4 | Hydrochloride, 132.5 | 60–70 | 2 |
| 13 | (2,6-dimethyl octyl-8)-amino-N-(cyclohexyl methyl) acetamide. | 194–196/0.4 | Hydrochloride, 141.5 | 95 | ¹2 |
| 14 | (2,6-dimethyl octyl-8)-amino-N-(3- or 4-methyl cyclohexyl methyl) acetamide. | 218–220/0.4 | Hydrochloride, 138–139 | 55–56 | 2 |
| 15 | (2-methyl-2-heptenyl-6)-amino-N-(2-methyl-2-heptenyl-6)-N-(isopropyl) acetamide. | 183/2 | Acid oxalate, 117 | 60–70 | 1 |
| 16 | Isoamylamino-N-(di-isoamyl)-acetamide | 153–155/3 | Acid oxalate, 208 (decomp.) | 75–85 | 1 |
| 17 | (2-methyl heptyl-6)-amino-N-(2-methyl heptyl-6)-N-(isoamyl) acetamide. | 181–183/0.1 | Acid oxalate, 95 | 75–85 or 95 | ²1 or 5 |
| 18 | (2,6-dimethyl-2-octenyl-8)-amino-N-bis-(2,6-dimethyl-2-octenyl-8)-acetamide. | 228–232/0.06 | | 75–85 | 1 |
| 19 | (2-methyl heptyl-6)-amino-N-(5-dehydronor-bornyl methyl) acetamide. | 194–195/0.08 | Mucinate, 148; acid oxalate, 178 (decomp.). | 50–60 | 3 |
| 20 | (2,6-dimethyl-2-octenyl-8)-amino-N-(5-dehydronor-bornyl methyl) acetamide. | 227–229/0.35 | Sulfamate, 148; hydrochloride, 146; mucinate, 145. | 55–65 | 3 |
| 21 | (2,6-dimethyl octyl-8)-amino-N-(norbornyl methyl) acetamide. | 216–218/0.2 | Hydrochloride, 165; sulfamate, 157; acid oxalate, 210 (decomp.); citrate, 115; mucinate, 140.5. | 95 | ¹3 |
| 22 | (2,6-dimethyl octyl-8)-amino-N-(5-dehydronorbornyl methyl) acetamide. | 220–222/0.4 | Hydrochloride, 156; sulfamate, 174. | 55–65 | 3 |
| 23 | (5-dehydronorbornyl methyl) amino-N-(2,6-dimethyl octyl-8)-acetamide. | 191–193/0.05 | Sulfamate, 143 | 60–70 | 3 |
| 24 | (2,6-dimethyl octyl-8)-amino-N-[1-(5-dehydronorbornyl)-1-ethyl] acetamide. | 217–219/0.4 | Hydrochloride, 160; sulfamate, 128; acid oxalate, 202 (decomp.). | 60–70 | 3 |
| 25 | Isoamylamino-N-(5-dehydronorbornyl methyl) acetamide. | 189–191/0.1 | Hydrochloride, 112 | 40–50 | 3 |

TABLE I—Continued

| Example | Compound | Boiling point (° C./mm. Hg) | Melting point (° C.) | Yield (percent of theory) | Preparation according to example |
|---|---|---|---|---|---|
| 26 | Dodecylamino-N-(5-dehydronorbornyl methyl) acetamide | [2] 205–208/0.05 | Hydrochloride, 117; sulfamate, 112 | 55–56 | 3 |
| 27 | (7-ethyl-2-methyl undecyl-4)-amino-N-(5-dehydronorbornyl methyl) acetamide | 206–209/0.15 | | 50–60 | 3 |
| 28 | (2-methyl-2-heptenyl-6)-amino-N-(2-methyl-2-heptenyl-6)-N-(isobutyl) acetamide | 192–195/3 | Acid oxalate, 151–152 | 60 | 3 |
| 29 | (2-methyl-2-heptenyl-6)-amino-N-(cyclohexyl)-N-(heptyl) acetamide | 200–202/0.3 | Acid oxalate, 89 | 50–60 | 3 |
| 30 | (2,6-dimethyl octyl-8)-amino-N-(3-cyclohexenyl-1-methyl)-N-(isobutyl) acetamide | 200–202/0.3 | Acid oxalate, 168 | 40–50 | 3 |
| 31 | (2,6-dimethyl octyl-8)-amino-N-(5-dehydronorbornyl methyl)-N-(2,6-dimethyl octyl-8)-acetamide | 215–217/0.3 | | 45 | 3 |
| 32 | (5-dehydronorbornyl methyl) amino-N-(5-dehydronorbornyl)-N-(2,6-dimethyl octyl-8) acetamide | 218–220/0.1 | | 40–50 | 3 |
| 33 | (2-methyl-2-heptenyl-6)-amino-N-bis-(2-methyl-2-heptenyl-6)-acetamide | 215–218/2 | Acid oxalate, 141–142 | 60 | 3 |
| 34 | Hexylamino-N-(norbornyl methyl)-N-(heptyl) acetamide | 211–213/0.1 | Acid oxalate, 162 | 50–60 | 3 |
| 35 | (2,6-dimethyl octyl-8)-amino-N-(norbornyl methyl)-N-(heptyl) acetamide | 231–233/0.2 | Acid oxalate, 142 | 40–50 | 3 |
| 36 | (2,6-dimethyl octyl-8)-amino-N-(5-dehydronorbornyl methyl)-N-(isopropyl) acetamide | 209–211/0.6 | ....do.... | 40–50 | 3 |
| 37 | (2-methyl-2-heptenyl-6)-amino-N-(2-norbornyl ethyl-1)-N-(isobutyl) acetamide | 182–183/0.2 | Acid oxalate, 94 | 40–50 | 3 |
| 38 | Isoamylamino-N-[(7-isopropyl-6-methyl-bicyclo-(2,2,2)-octyl-3)-methyl]-N-(isobutyl) acetamide | 181/0.3 | Acid oxalate, 161 | 40–50 | 3 |
| 39 | (2-methyl-2-heptenyl-6)-amino-N-(2-methyl-2-heptyl-6)-N-(isoamyl) acetamide | 200–203/4 | Acid oxalate, 78 | 35–40 or 50–60 | 4 or 9 |
| 40 | (Dodecyl-1)-amino-N-(dodecyl-1)-acetamide | 228–230/1.5 | | 60–70 | 7 |
| 41 | (2,6-dimethyl-2-octenyl-8)-amino-N-[1-(5-dehydronorbornyl)-1-ethyl] acetamide | 206–209/0.2 | Hydrochloride, 166; sulfamate, 127; acid oxalate, 198 (decomp.). | 70–80 | 9 |
| 42 | (2-methyl-2-heptenyl-6)-amino-N-[(7-isopropyl-6-methyl-bicyclo-(2,2,2)-octyl-3)-methyl] acetamide | 207–210/0.4 | Acid oxalate, 159–161 | 40–50 | 3 |

[1] By hydrogenation. [2] Melting point, 31–32° C.

Acid addition salts of the new bases are prepared in a manner known per se. For instance, the base is dissolved in a suitable solvent and the equimolecular amount of the respective acid is added thereto or, if the acid is a gas, at room temperature, the gaseous acid is introduced into the solution. The acid addition salt either precipitates due to its insolubility in the solvent or it is recovered from its solution by evaporating the solvent, if required, in a vacuum. It is, of course, understood that only such acids are used for producing therapeutically useful salts which are tolerated by the human and animal body in the concentrations in which the salts are applied thereto and which do not react with and/or have any other detrimental effect upon the base.

As stated above, the new glycine amides and their acid addition salts have a high bacteriostatic activity. They are effective in vitro against Staphyllococci and Streptococci in dilutions between about 1:200,000 and about 1:400,000. Table II illustrates the results achieved by testing the bacteriostatic activity of the acid addition salts of the following bases in the test tube dilution test against Staphylococcus aureus ATCC 6538 grown in standard Merck nutrient bouillon:

TABLE II

| No. | Compound | Effective dilution |
|---|---|---|
| 1 | (2, 6-dimethyl octyl-8)-amino-N-(norbornyl methyl) acetamide hydrochloride. | 1:200,000 |
| 2 | (2, 6-dimethyl octyl-8)-amino-N-(3- or, respectively, 4-methyl cyclohexyl methyl) acetamide hyhrochloride. | 1:200,000 |
| 3 | (2, 6-dimethyl octyl-8)-amino-N-(5-dehydronorbornyl methyl)-N-(isopropyl) acetamide hydrochloride. | 1:200,000 |
| 4 | (2-methyl-2-heptenyl-6)-amino-N-(cyclohexyl)-N-(heptyl) acetamide hydrochloride. | 1:400,000 |
| 5 | Isoamylamino-N-[(7-isopropyl-6-methyl bicyclo-(2,2,2)-octyl-3)-methyl]-N-(isopropyl) acetamide hydrochloride. | 1:200,000 |
| 6 | (2-methyl heptyl-6)-amino-N-(2-methyl heptyl-6)-N-(isoamyl) sulfamate sulfonate. | 1:200,000 |

The new compounds and their acid addition salts are used as such or in mixture with each other in the treatment of infections caused by Staphylococci, Streptococci, or Coli. They have proved to be especially effective in the treatment of chronic and acute mastitis of animals and especially of cows. They are preferably administered by infusion into the infected udder through the teat canal. About 20 cc. to 30 cc. of an aqueous solution or emulsion are instilled into each quarter of the bovine udder. Twelve hours after instillation of the drug the treated gland is completely evacuated by milking. If required, treatment is repeated. In general, complete recovery is achieved by a treatment with solutions of the glycine amide containing between about 0.1% and about 1.0% and preferably between 0.4% and 0.8%, which may be repeated in intervals of twelve hours. Such concentrations of the glycine amides according to the present invention are well tolerated without irritation by the infected gland as well as by the healthy udder tissue, even when administered repeatedly.

As stated above, the new glycine amides and their acid addition salts are preferably administered in the form of solutions. Suitable solvents for preparing such instillation solutions are, for instance, water, diethylene glycol, 1,2-propylene glycol, 1,3-butylene glycol, esters of higher fatty acids, such as myristic acid isopropyl ester, palmitic acid isopropyl ester, and the like, 2,2-dimethyl-4-hydroxy methyl-1,3-dioxolane, sold under the trademark "Solketal," or mixtures of said solvents.

Salts of the new glycine amides according to the present invention with organic acids such as undecylenic acid are surprisingly soluble in paraffin oil, for instance, the undecylenate of (2,6-dimethyl octyl-8)-amino-N-(norbornyl methyl) acetamide.

The new glycinamides may also be administered in the form of emulsions or suspensions.

The purpose of the treatment of bovine mastitis is twofold, namely (a) To cure and heal the acute, subchronic, or even chronic inflammation of the udder caused by bacteria and (b) To effect sanitation of herds by destroying the bacteria carried by animals which show no outward manifestations but harbor and excrete the infectious agents of the disease or by animals that suffered a relapse.

It is known that a favorable rate of cure can be achieved by the use of suitable antibiotics and chemotherapeutic agents. However, to effect complete sanitation is a more difficult task and frequently is not achieved at all. In contrast thereto clinical tests have shown that the new glycine amides according to the present invention not only produce a rate of cure which is at least equal to that of the known anti-mastitis agents but in general produce even superior results because the clinical symptoms disappear more rapidly than on treatment with the known agents.

Suitable combinations of a glycine amide salt and an antibiotic are for example:

A 0.4% solution of (2-methyl heptyl-6)-amino-N-(2-methyl heptyl-6)-N-(isoamyl) acetamide (as undecylenate) in paraffin oil is mixed with tetracycline hydrochloride in such a concentration that the portion of the suspended tetracycline hydrochloride is 0.2%.

A 0.2% solution of dihydrostreptomycin sulphate in water is mixed shortly before the therapeutic application with (2,6-dimethyl octyl-8)-amino-N-(norbornyl methyl) acetamide in such a concentration that the portion of the suspended glycine amide salt is 0.3% calculated for the free base.

According to an advantageous embodiment of the present invention the very effective therapeutic results achieved by the administration of the new glycine amides can be improved considerably by simultaneous administration of antibiotics used heretofore in the treatment of mastitis in a dose which is far below the effective dose of such drugs and is only about one third to one fifth of said dose. Such a combination therapy has the further advantage that sanitation of the herds is rapidly achieved. Simultaneous administration of the new glycine amides and of antibiotics and especially of penicillin may be replaced by administration of the acid addition salts of glycine amides with acidic antibiotics and especially with penicillin.

Preparations according to the present invention which have successfully been used in mastitis therapy are, for instance, solutions of the following salts in the given concentrations:

|  | Percent |
|---|---|
| (a) (2,6-dimethyl octyl-8)-amino-N-norbornyl methyl)acetamide undecylenate | 0.2 |
| (b) (2-methyl heptyl-6)-amino-N-(2-methyl heptyl-6)-N-(isoamyl)acetamide sulfamate | 0.4 |
| (c) (2,6-dimethyl octyl-8)-amino-N-(norbonyl methyl) acetamide penicillinate | 0.2 |

Preparation of the acid addition salts of the new glycine amide:

EXAMPLE 43

*(2,6-dimethyl octyl-8)-amino-N-(norbornyl methyl) acetamide undecylenate*

18.4 g. of 10-undecylenic acid are added to 32.2 g. of (2,6-dimethyl octyl-8)-amino-N-(norbornyl methyl)-acetamide under slight heating and the solution is thoroughly mixed by stirring. The undecylenate $C_{31}H_{58}O_3N_2$ is a light yellow viscous oil which is not soluble in water but easily soluble in methanol, acetone, ether, hexane and does not tend to solidification.

*Analysis.*—Calculated: C, 73.60%; H, 11.45%; N, 5.54%. Found: C, 73.72%; H, 11.55%; N, 5.55%.

EXAMPLE 44

*(2-methyl heptyl-6)-amino-N-(2-methyl heptyl-6)-N-(isoamyl) acetamide sulfamate*

36.8 g. of (2-methyl heptyl-6)-amino-N-(2-methyl heptyl-6)-N-(isoamyl) acetamide, dissolved in 250 cc. of dry ether, are mixed with 9.7 g. of amidosulfonic acid and boiled under reflux on the water bath until the amidosulfonic acid is completely dissolved. After evaporation of the solvent remains the sulfamate $C_{23}H_{57}O_4N_3S$ in form of a viscous limpid oil which is easily soluble in water and soluble in ether and which does not tend to crystallisation.

*Analysis.*—Calculated: C, 59.35%; H, 10.97%; N, 9.03%; S, 6.88%. Found: C, 59.28%; H, 11.06%; N, 9.11%; S, 6.81%.

EXAMPLE 45

*(2,6-dimethyl octyl-8)-amino-N-(norbornyl methyl) acetamide penicillinate*

35.85 g. of (2,6-dimethyl octyl-8)-amino-N-(norbornyl methyl) acetamide hydrochloride and 35.60 g. of penicillin G sodium are each for itself alone dissolved in 150 cc. of methanol and then mixed together while cooling. The clear methanol solution is diluted with 1000 cc. of water whereby the penicillin salt precipitates in semi-solid form. The aqueous solution is extracted three times with ether, each time with 250 cc. and the ethereal solution washed twice with water, each time with 250 cc. of water whereby the salt may be deprived of the methanol layer. After drying with magnesium sulfate the ether is distilled carefully. The penicillin salt of the glycine amide $C_{36}H_{56}O_5N_4S$ remains in form of a white hygroscopic powder of the melting point 73° C.

*Analysis.*—Calculated: C, 65.90%; H, 8.53%; N, 8.53%; S, 4.88%. Found: C, 65.77%; H, 8.57%; N, 8.49%; S, 4.92%.

It may be pointed out that the amount of penicillin present in the penicillin addition salts of the new glycine amides is considerably below the amount which usually is considered to be necessary for curative effects. The surprisingly high activity of such penicillin salts thus is due mainly to the high bacteriostatic activity of the glycine amides which exert a noteworthy increase of the effect. Extensive clinical tests were carried out with a solution of (2,6-dimethyl octyl-8)-amino-N-(norbornyl methyl) acetamide undecylenate in paraffin oil (petrolatum). The concentration of these solutions was 0.4% and 0.8%, calculated for the free base. Cows the mammary glands of which were infected (1) With *Streptococcus agalactiae* or cows suffering from mastitis caused by (2) *Staphylococcus aureus hemolyticus* were treated with said solution. All the animals were taken ill on mastitis for three to four weeks and three of four quarters of the udder were affected by the disease. The presence of said bacteria was detected and ascertained by bacteriological tests. The infected animals were treated during said three to four weeks periods by intramammary infusion with penicillin, streptomycin, aureomycin, terramycin, neomycin, bacitracin, the sulfonamide "Supronal" (an equimolecular combination of 4-homosulfanilamide salt of 1-sulfanilyl-2-thiourea and sulfamerazine). In each instance bacteria resistant to the antibiotics and sulfonamides were observed.

The animals were then treated with 10 cc. of the above mentioned glycine amide solution which was infused into the infected gland through the teat canal. Five days after such a treatment the animals were investigated bacteriologically and it was found that in about 50% of the animals the Staphylococcus infection had disappeared within five days after infusion. Only an increased cell content could be detected in the treated quarters of the udder of such animals. The other 50% of the treated animals showed only a very small number of Staphylococci on bacteriological testing. When subjecting the incompletely cured animals to a second treatment, it was found on bacteriological tests after five days that the infection was completely eliminated. It is evident that the treatment with the new glycine amide according to the present invention is highly effective and that all the treated animals were cured and were free of mastitis-causing bacteria within ten days. No irritation was observed and the drug well tolerated. The first milk obtained after the infusion was somewhat watery but 12 hours thereafter the milk had its normal macroscopic appearance and properties.

The following examples serve to illustrate the composition of preparations which have proved to be useful in the treatment of mastitis infections without, however, being limited thereto.

EXAMPLE 46

6.5 g. of the undecylenic acid salt of (2,6-dimethyl octyl-8)-amino-N-(norbornyl methyl) acetamide are dissolved in 1000 cc. of paraffin oil. The resulting solution which contains about 0.4% of the active ingredient calculated for the free base is used for infusion treatment. 10 cc. thereof are instilled through the teat canal into the infected udder quarter after it has been milked out and has been thoroughly cleaned with soap and water. The instilled solution is dispersed in the udder by massaging.

EXAMPLE 47

10.3 g. of (2-methyl heptyl-6)-amino-N-(2-methyl heptyl-6)-N-(isoamyl) acetamide sulfamate are dissolved in 1000 cc. of water to yield a solution containing 0.8% of the active drug calculated for the free base. 10 cc. to 20 cc. of said solution are instilled into the infected udder quarter as described hereinabove.

EXAMPLE 48

4.16 g. of the benzyl penicillinic acid salt of (2,6-dimethyl octyl-8)-amino-N-(norbornyl methyl) acetamide are dissolved just before the therapeutical application in 1000 cc. of a mixture of 16% of "Solketal" and 84% of myristic acid isopropanol ester or 1000 cc. of a mixture of 16% of "Solketal," 64% of myristic acid isopropanol ester and 20% of paraffin oil to yield a solution containing about 0.2% of the active drug calculated for the free base and about 0.22% of penicillin. 10 cc. to 20 cc. of said solution which contain about 22 mg. to about 44 mg. of penicillin, i.e. about 40,000 units to 80,000 units have proved to be fully effective in the treatment of mastitis. It is evident that this amount is only about 8% of the normally administered dose of penicillin when used in combination with the glycine amide according to the present invention.

EXAMPLE 49

4.0 g. of 2-methyl heptyl-6)-amino-N-(2-methyl heptyl-6)-N-(isoamyl) acetamide sulfamate and 10 g. of polyvinyl pyrrolidone of the medium molecular weight of 25,000 are dissolved in 1000 cc. of distilled and sterile water. 10 cc. to 20 cc. of said solution were infused into the infected udder as described above.

The starting materials and reactants mentioned in the above Examples 1 to 10 are prepared as will be described in the following table.

TABLE III

| Example No. | Starting materials (reactants) | Prepared from (by reaction)— |
|---|---|---|
| 1 | Chloro acetyl-(2-methyl-2-heptenyl-6)-amide. | Chloroacetylchloride and 6-amino-2-methyl-2-hepten. |
| 2 | 8-amino-2,6-dimethyl-2-octene. | 8-oximo-2,6-dimethyl-2-octene by reduction with sodium and alcohol. |
| 2 | Chloro acetyl cyclohexyl amide. | Chloroacetylchloride and cyclohexyl amine. |
| 3 | Chloro acetyl nor-bornyl amide. | Chloroacetylchloride and nor-bornylamine. |
| 5 | 6-isopropylamino-2-methyl-2-heptene. | 2-methyl-2-hepten-6-on and isopropyl amine by reductive condensation. |
| 6 | (2,6-dimethyl-2-octenyl-8)-amino acetic acid ethyl ester. | Amino acetic ethyl ester and citronellal by reductive condensation. |
| 7 | Chloro acetyl-(5-dehydro-norbornyl-methyl) amide. | Chloroacetylchloride and 5-dehydro-norbornyl-methylamine. |
| 9 | Amino-N-(5-dehydro-norbornyl-methyl) acetamide. | Chloro-N-(5-dehydro-norbornyl-methyl) acetamide and ammonia. |

We claim:

1. (2,6-dimethyl octyl-8)-amino-N-(norbornyl methyl) acetamide hydrochloride.
2. (2,6-dimethyl octyl-8)-amino-N-(norbornyl methyl) acetamide undecylenate.
3. (2,6-dimethyl octyl-8)-amino-N-(norbornyl methyl) acetamide penicillinate.
4. The glycine amide compound selected from the group consisting of (2,6-dimethyl octyl-8)-amino-N-(norbornyl methyl) acetamide and its pharmaceutically acceptable acid addition salts.
5. (2-methyl heptyl-6)-amino-N-(2-methyl heptyl-6)-N-(isoamyl)acetamide sulfamate.
6. The glycine amide compound selected from the group consisting of (2-methyl heptyl-6)-amino-N-(2-methyl heptyl-6)-N-(isoamyl) acetamide and its pharmaceutically acceptable acid addition salts.
7. (2,6-dimethyl octyl-8)-amino-N-(methyl cyclohexyl methyl) acetamide hydrochloride.
8. The glycine amide compound selected from the group consisting of (2,6-dimethyl octyl-8)-amino-N-(methyl cyclohexyl methyl) acetamide and its pharmaceutically acceptable acid addition salts.
9. (2,6-dimethyl octyl-8)-amino-N-(5-dehydronorbornyl methyl)-N-(isopropyl) acetamide hydrochloride.
10. The glycine amide compound selected from the group consisting of (2,6-dimethyl octyl-8)-amino-N-(5-dehydronorbornyl methyl)-N-(isopropyl) acetamide and its pharmaceutically acceptable acid addition salts.
11. (2 - methyl-2-heptenyl-6)-amino-N-(cyclohexyl)-N-(heptyl) acetamide hydrochloride.
12. The glycine amide compound selected from the group consisting of (2-methyl-2-heptenyl-6)-amino-N-(cyclohexyl)-N-(heptyl) acetamide and its pharmaceutically acceptable acid addition salts.
13. Isoamylamino - N - [(7-isopropyl-6-methyl bicyclo-(2,2,2)-octyl-3)-methyl]-N-(isopropyl) acetamide hydrochloride.
14. The glycine amide compound selected from the group consisting of isoamylamino - N - [(7-isopropyl-6-methyl bicyclo - (2,2,2)-octyl-3)-methyl]-N-(isopropyl) acetamide and its pharmaceutically acceptable acid addition salts.

References Cited by the Examiner

UNITED STATES PATENTS

| | | | |
|---|---|---|---|
| 2,139,190 | 12/1938 | Iselin et al. | 260—561 |
| 2,295,655 | 9/1942 | Hentrich et al. | 260—561 |
| 2,523,275 | 9/1950 | Bruce et al. | 260—561 X |
| 2,548,863 | 4/1951 | Bruce et al. | 260—561 |
| 2,576,106 | 11/1951 | Cusic | 260—561 |
| 2,746,959 | 5/1956 | Bruce et al. | 260—239.1 |
| 2,816,911 | 12/1957 | Aelony | 260—561 X |
| 2,912,459 | 11/1959 | Boehme et al. | 260—561 |
| 2,921,085 | 1/1960 | Schramm | 260—561 X |
| 2,926,172 | 2/1960 | Boehme et al. | 260—561 X |
| 2,946,789 | 7/1960 | Prapas | 260—239.1 X |
| 3,086,913 | 4/1963 | Hamilton et al. | 167—65.2 |
| 3,121,665 | 2/1964 | Parfentje | 167—65.2 |
| 3,130,227 | 4/1964 | Takahashi et al. | 260—557 |

OTHER REFERENCES

Fujimura et al.: "Chemical Abstracts," page 3833c (1957).

Lucas: Organic Chemistry (2nd ed.), published by the American Book Co., N.Y., pages 653–655 (1953).

Vejdelek et al.: Chem. Abstracts, vol. 54, page 24852 (1960). (Abstract of Czech. Patent 90,381, May 15, 1959.)

WALTER A. MODANCE, *Primary Examiner.*

IRVING MARCUS, DUVAL T. McCUTCHEN,
*Examiners.*